June 27, 1939.  M. R. COE  2,164,030
PROCESS FOR CURING PLANT FOLIAGE
Filed March 16, 1935
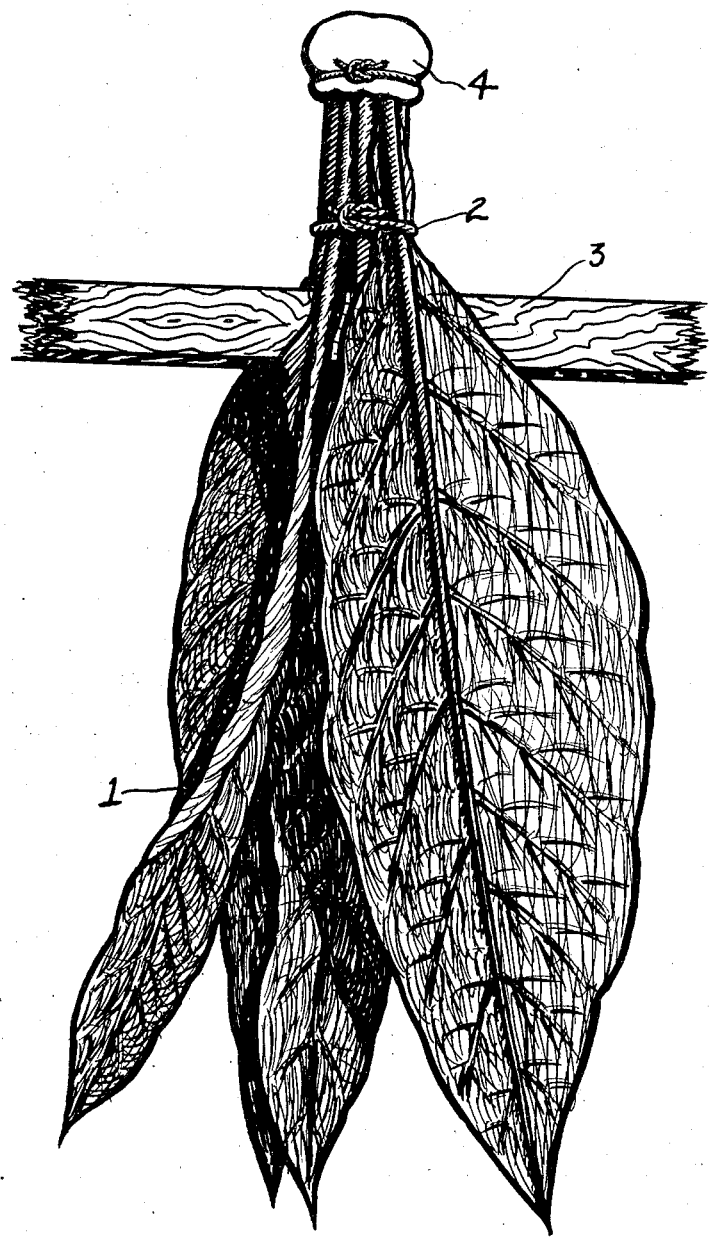
MAYNE R. COE *Inventor*
By *[signatures]* Attorneys Patented June 27, 1939

2,164,030

UNITED STATES PATENT OFFICE 2,164,030

PROCESS FOR CURING PLANT FOLIAGE

Mayne R. Coe, Washington, D. C.

Application March 16, 1935, Serial No. 11,441

2 Claims. (Cl. 131—6)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without payment to me of any royalty thereon.

My invention relates to a process for improving the color of tobacco and all plant foliage products which tend to turn brown or darken after separation from the main plant. It is well known that tobacco changes in color during the curing stage from a light golden yellow to a dark brown, depending on the method of curing. Flue cured tobacco is notably of a light color but this brought about by quick drying at high heat. That tobacco is largely denatured by this process is shown by its strong smoking quality and stinging effect on the throat and tongue. Shade-grown tobacco is of a lighter brown in color than the normally grown tobacco, but the expense of growing such tobacco is large compared to the common sun-grown and air or barn cured tobacco.

I have discovered a method of curing tobacco tion is applied before the yellowing stage (not to be confused with the yellow shade of green which determines the ripened stage) previous to browning, the tobacco leaf is apt to cure a yellow green in color. Unless this color is desirable the inhibiting treatment should not be applied until the leaf at least has become completely yellowed.

While it will be appreciated that my invention may be applied to other plant foliage in various ways, the following examples of its use are given merely as illustrations in furtherance of clarity, it being understood that I do not wish to limit myself to the particular procedure disclosed since it is obvious that the invention may be used by other methods and the same result obtained.

To produce a bright yellow tobacco leaf, apply lemon juice to both sides of the leaf with an atomizer after the leaf has turned the desired bright yellow color usually obtained, for example, by flue curing.

To obtain a light brown tobacco comparable to cigar wrapper tobacco, apply lemon juice sprdipped in the inhibiting solution, for example, one gallon of lemon juice to twenty gallons of water, and the bunches replaced on the pole again. The leaves absorb the liquid by capillarity and in so doing the oxidase and peroxidase in the leaf is prevented from functioning by capillary absorption. Practice will determine the amount of liquid necessary to result in uniform color throughout the leaf. Two or more dippings may be necessary if absorbent capacity is too small. This treatment tends to make a thin leaf when cured which is so desirable for cigar wrappers.

In the above examples any plant leaf may be substituted for tobacco, and pineapple juice, glutathione, cysteine or any sulphydryl containing amino acid substituted for lemon juice. In fact any agent capable of terminating the enzyme action of oxidase and peroxidase as hereinbefore disclosed is effective in the process.

The above process is adapted for use in combination with the curing of tobacco and other plant foliage products under favorable light conditions as taught by my co-pending application, Serial No. 701,733, filed December 9, 1933, that is, by the admission during the curing period only of the light above 4900 Angstrom units of the spectrum and particularly light having the characteristics of chlorophyll green.

Having thus fully described my invention, I claim:

1. In the process of treating tobacco leaves, the steps comprising exposing cut surfaces of the leaves during their curing and color transition period to an absorbent material saturated with a sulphydryl containing amino acid.

2. In the process of treating tobacco leaves, the step comprising exposing cut surfaces of the leaves during their curing and color transition period to an absorbent material saturated with hydrogen peroxide.

MAYNE R. COE.